US012157321B2

(12) United States Patent
Herrmann et al.

(10) Patent No.: US 12,157,321 B2
(45) Date of Patent: Dec. 3, 2024

(54) SYSTEM AND METHOD FOR IMPROVING INK IMAGE QUALITY IN AN INKJET PRINTER

(71) Applicant: Xerox Corporation, Norwalk, CT (US)

(72) Inventors: Douglas K. Herrmann, Webster, NY (US); Seemit Praharaj, Webster, NY (US); Jason M. LeFevre, Penfield, NY (US); Jorge A. Alvarez, Webster, NY (US); Chu-Heng Liu, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 150 days.

(21) Appl. No.: 18/163,154

(22) Filed: Feb. 1, 2023

(65) Prior Publication Data

US 2024/0253363 A1 Aug. 1, 2024

(51) Int. Cl.
*B41J 2/21* (2006.01)

(52) U.S. Cl.
CPC .................................. *B41J 2/2132* (2013.01)

(58) Field of Classification Search
CPC ...................................................... B41J 2/2132
See application file for complete search history.

(56) References Cited

U.S. PATENT DOCUMENTS

| | | | | |
|---|---|---|---|---|
| 6,373,042 | B1 | 4/2002 | Kretschmann et al. | |
| 7,519,222 | B2 | 4/2009 | Kisilev et al. | |
| 8,104,861 | B2 * | 1/2012 | Saettel | B41J 2/2135 347/19 |
| 9,016,822 | B1 * | 4/2015 | Armbruster | B41J 2/2132 347/15 |
| 9,016,823 | B1 * | 4/2015 | Armbruster | B41J 2/2132 347/15 |
| 9,423,748 | B1 | 8/2016 | Robinson et al. | |
| 11,489,146 | B2 | 11/2022 | Harjee et al. | |
| 2011/0109918 | A1 | 5/2011 | Conlon et al. | |
| 2015/0116408 | A1 * | 4/2015 | Armbruster | G03G 15/5062 347/15 |
| 2015/0116412 | A1 | 4/2015 | Duke et al. | |
| 2022/0044373 | A1 | 2/2022 | Taylor et al. | |

* cited by examiner

*Primary Examiner* — Scott A Richmond
(74) *Attorney, Agent, or Firm* — Maginot Moore & Beck LLP

(57) ABSTRACT

An inkjet printer prints on a first side of a media sheet less than all of the color separations in an image, generates a first set of image data of the printed color separations to identify image features, returns the partially printed media sheet to a position that precedes the print zone in the printer, generates a second set of image data of the partially printed media sheet before it reenters the print zone to identify the image features, compares the positions of the image features in the first set of image data to the positions of the image features in the second set of image data to register one or more color separations remaining to be printed with the color separations printed on the first side of the media sheet, and prints the remaining registered color separations on the first side of the partially printed media sheet.

24 Claims, 6 Drawing Sheets
(3 of 6 Drawing Sheet(s) Filed in Color)

SYSTEM AND METHOD FOR IMPROVING INK IMAGE QUALITY IN AN INKJET PRINTER

TECHNICAL FIELD

This disclosure relates generally to devices that produce ink images on media, and more particularly, to the production of ink images on coated media in such devices.

BACKGROUND

Inkjet imaging devices, also known as inkjet printers, eject liquid ink from printheads to form images on an image receiving surface. The printheads include a plurality of inkjets that are arranged in an array. Each inkjet has a thermal or piezoelectric actuator that is coupled to a printhead controller. The printhead controller generates firing signals that correspond to digital data content corresponding to images. The actuators in the printheads respond to the firing signals by expanding into an ink chamber to eject ink drops onto an image receiving surface and form an ink image that corresponds to the digital image content used to generate the firing signals. The image receiving surface is usually a continuous web of media material or a series of media sheets.

Inkjet printers used for producing color images typically include multiple printhead assemblies. Each printhead assembly includes one or more printheads that usually eject a single color of ink. In a typical inkjet color printer, four printhead assemblies are positioned in a process direction with each printhead assembly ejecting a different color of ink. The four ink colors most frequently used are cyan, magenta, yellow, and black. The common nomenclature for such printers is CMYK color printers. Some CMYK printers have two printhead assemblies that print each color of ink. The printhead assemblies that print the same color of ink are offset from each other by one-half of the distance between adjacent inkjets in the cross-process direction to double the number of pixels per inch density of a line of the color of ink ejected by the printheads in the two assemblies. As used in this document, the term “process direction” means the direction of movement of the image receiving surface as it passes the printheads in the printer and the term “cross-process direction” means a direction that is perpendicular to the process direction in the plane of the image receiving surface.

Image quality in color inkjet printers depends upon on many factors such as ink chemistry, printhead technology, thermals in the vicinity of the ink drops, print process setpoints, airflows, and ink-to-media spreading and drying interactions. One issue that degrades image quality is the level of overlay graininess that results when ink images are printed on coated media or stocks. As the ink drops from each printhead assembly are ejected onto the coated stock, they accumulate since the coating attenuates the absorption of the ink into the stock. Consequently, the ink drops merge or pool together and when this accumulated ink is dried, the image quality is adversely impacted. Reducing the effect of media coating on ink image quality during ink image printing would be beneficial.

SUMMARY

A color inkjet printer is configured to print ink images in stages separated by ink drying so the ink drops are fixed to the surface of the coated sheets without the degree of merging or pooling previously experienced. The color inkjet printer includes at least one printhead; a media transport for moving a media sheet through a print zone opposite the at least one printhead in a process direction; a first optical sensor that precedes the print zone in the process direction; a second optical sensor that follows the print zone in the process direction; a dryer that follows the at least one printhead in the process direction and that precedes the second optical sensor in the process direction, the dryer being configured to expose the media sheet to heat; a return path that returns the media sheet to the media transport at a position that precedes the first optical sensor; and a controller operatively connected to the at least one printhead, the media transport, the first optical sensor, the second optical sensor, and an actuator that diverts the media sheet onto the return path. The controller is configured to: operate the at least one printhead to print less than all color separations for an ink image to be printed on a first side of the media sheet as the media sheet passes through the print zone a first time; operate the second optical sensor to generate image data of the color separations printed on the media sheet after the media sheet has passed through the print zone the first time; analyze the image data generated by the second optical sensor to identify image features in the color separations printed on the media sheet; operate the actuator to divert the media sheet to the return path without inverting the media sheet to enable the first side of the media sheet to be printed a second time; operate the first optical sensor to generate image data of the color separations printed on the first side of the media sheet before the media sheet passes through the print zone the second time; analyze the image data generated by the first optical sensor to identify the image features in the color separations printed on the first side of the media sheet; compare positions of the image features in the image data generated by the second optical sensor to positions of the image features in the image data generated by the first optical sensor to register ink image content data for color separations remaining to be printed with the color separations printed on the first side of the media sheet; and operate the at least one printhead to print at least one of the color separations remaining to be printed on the first side of the media sheet as the media sheet passes through the print zone the second time.

A method of operating a color inkjet printer prints ink images in stages separated by ink drying so the ink drops are fixed to the surface of the coated sheets without the degree of merging or pooling previously experienced. The method includes operating at least one printhead in the inkjet printer to print on a first side of a media sheet less than all color separations for an ink image to be printed on the media sheet as the media sheet passes through a print zone opposite the at least one printhead a first time; operating a first optical sensor to generate image data of the color separations printed on the first side of the media sheet after the media sheet has passed through the print zone the first time; analyzing the image data generated by the first optical sensor to identify image features in the color separations printed on the first side of the media sheet; diverting the media sheet to a return path that is configured to return the media sheet to a media transport at a position that precedes a second optical sensor without inverting the media sheet; operating the second optical sensor to generate image data of the color separations printed on the first side of the media sheet before the media sheet passes through the print zone a second time; analyzing the image data generated by the second optical sensor to identify the image features in the color separations printed on the first side of the media sheet; comparing positions of the image features in the image data generated by the second optical sensor to positions of the image features in the image data generated by the first optical sensor to register ink image content data for color separations remaining to be printed with the color separations printed on the first side of the media sheet; and operating the at least one printhead to print at least one of the color separations remaining to be printed on the first side of the media sheet as the media sheet passes through the print zone the second time.

BRIEF DESCRIPTION OF THE DRAWINGS

The foregoing aspects and other features of a color inkjet printer and color inkjet printer operational method that prints ink images in stages separated by ink drying so the ink drops are fixed to the surface of the coated sheets without the degree of merging or pooling previously experienced are explained in the following description, taken in connection with the accompanying drawings.

The patent or application file contains at least one drawing executed in color. Copies of this patent or patent application publication with color drawing(s) will be provided by the Office upon request and payment of the necessary fee.

DETAILED DESCRIPTION

Figure 1:
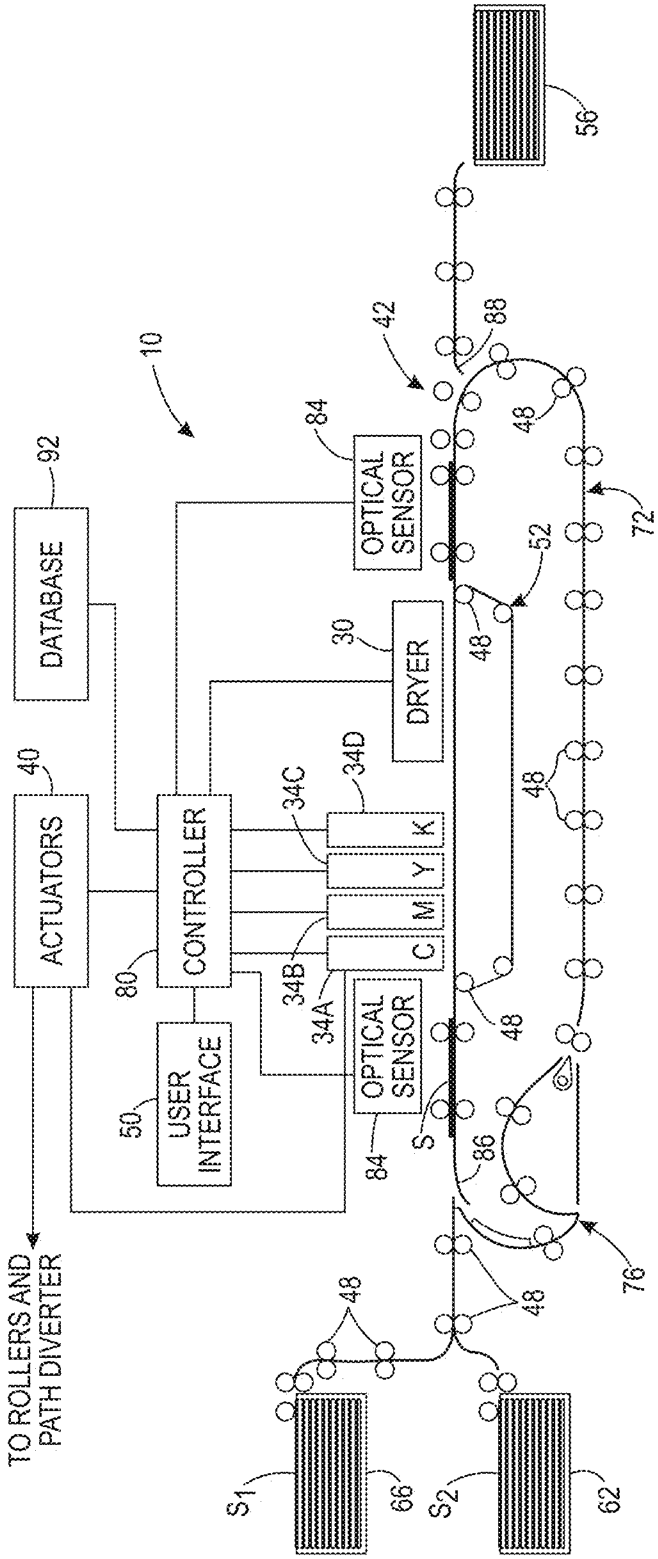
FIG. 1 is a schematic drawing of a color inkjet printer that is configured with an optical sensor that precedes the print zone of the printer in the process direction.

For a general understanding of the environment for the printer and the printer operational method disclosed herein as well as the details for the printer and the printer operational method, reference is made to the drawings. In the drawings, like reference numerals have been used throughout to designate like elements. As used herein, the word "printer" encompasses any apparatus that ejects ink drops onto media to form ink images.

The printer and method described below print less than all of the color separations that form an ink image, pass the partial image through an ink drier, and then print the remaining color separations of the ink image before drying the completed ink image. The issue that has to be addressed to enable this type of ink image printing is the registration of the remaining color separations to the previously printed color separations. Because the media sheet onto which the first color separations are printed is returned to the printing path along a return path without inverting the sheet, the partial image on the sheet is not aligned with the orientation of the sheet when it first passed through the print zone for the printing of the first color separations. To adjust the remaining color separations so they are registered with the previously printed color separations, an optical sensor is positioned between the reentry position of the printed sheet from the non-inverting return path to the media transport that carries the returned, non-inverted sheet through the print zone a second time. The image data generated by the optical sensor is analyzed to identify feature fiducials in the previously printed color separations and the positions of these identified features are used to adjust the image content data for the remaining color separations to be printed. Thus, the remaining color separations are registered to the previously printed color separations before the remaining color separations are printed. Without the imaging of the previously printed color separations at the position where the printed sheet is approaching the print zone, an appropriate adjustment of the image content data for the remaining color separations could not be made accurately.

FIG. 1 depicts a high-speed color inkjet printer 10 that is configured to print a partial ink image, expose the partial ink image to drying, return the media bearing the partial ink image to a position that precedes the print zone in the process direction, generate image data of the partial ink image, and use the generated image data of the partial image to adjust the image content data for the remainder of the ink image before the remainder of the ink image is printed. As illustrated, the printer 10 is a printer that directly forms an ink image on a surface of a media sheet stripped from one of the supplies of media sheets $S_1$ or $S_2$ and the sheets S are moved through the printer 10 by the controller 80 operating one or more of the actuators 40 that are operatively connected to rollers or to at least one driving roller of conveyor 52 that comprises a portion of the media transport 42 that passes through the print zone PZ of the printer. As used in this document, the term "partial ink image" or "partially printed image" means an ink image on a media sheet that contains less than all of the color separations needed to print an ink image that corresponds to all of the ink image content data for an image. As used in this document, the term "print zone" means the portion of the media transport that is opposite any of the printhead assemblies in the printer.

The printer 10 is configured to perform print jobs sent to the printer by an external data source. As used in this document, the term "print job" means ink image content data for an ink image to be produced by a printer and the print job parameters at which the printer is operated to produce the ink image. The ink image content data is sent to the controller 80 from either an external data source, such as a scanning system or an online or work station connection. The ink image content data is processed to generate the inkjet ejector firing signals delivered to the printheads in the modules 34A-34D. Along with the ink image content data, the controller also receives print job parameters that identify the media weight, media dimensions, print speed, media type, ink area coverage to be produced on each side of each sheet, location of the image to be produced on each side of each sheet, media color, media fiber orientation for fibrous media, print zone temperature and humidity, media moisture content, media manufacturer, and the like for executing a print job. As used in this document, the term "print job parameters" means non-image content data for a print job and the term "ink image content data" means digital data that identifies a color and a volume of each ejected ink drop that forms pixels in an ink image to be printed on a media sheet.

In one embodiment, each printhead module of the printer 10 has only one printhead that has a width that corresponds to a width of the widest media in the cross-process direction that can be printed by the printer. In other embodiments, the printhead modules have a plurality of printheads with each printhead having a width that is less than a width of the widest media in the cross-process direction that the printer can print. In these modules, the printheads are arranged in an array of staggered printheads that enables media wider than a single printhead to be printed. Additionally, the printheads within a module or between modules can also be interlaced so the density of the drops ejected by the printheads in the cross-process direction can be greater than the smallest spacing between the inkjets in a printhead in the cross-process direction. Although printer 10 is depicted with only two supplies of media sheets, the printer can be configured with three or more sheet supplies, each containing a different type or size of media.

The media transport 42 includes a belt for moving print media, such as paper sheets, envelopes, or any other article suitable for receiving printed images, through the print zone so the printheads can eject ink drops onto the moving media to form printed images on the media. The belt has holes in it and the belt moves over a vacuum plenum within the conveyor 52 so a suction force can be generated through the surface of the belt. Each print medium engages a portion of the holes on the surface of the belt and the suction force holds the print medium to the surface of the belt to prevent the print media from slipping or otherwise moving relative to the surface of the belt as the belt moves through the printer. Holding each print medium in place relative to the surface of the moving belt enables the printer to control the timing of the operation of printheads to ensure that the printheads form printed images in proper locations on each print medium and ensures that the print media do not cause jams or other mechanical issues with the printer. In large-scale printer configurations, the belt often carries multiple print media simultaneously.

With continued reference to FIG. 1, a partially printed image passes under an image dryer 30 after the ink image is printed on a sheet S. The image dryer 30 can include an infrared heater, a heated air blower, air returns, or combinations of these components to heat the ink image and at least partially fix an image to the web. An infrared heater applies infrared heat to the printed image on the surface of the web to evaporate water or solvent in the ink. The heated air blower directs heated air using a fan or other pressurized source of air over the ink to supplement the evaporation of the water or solvent from the ink. The air is then collected and evacuated by air returns to reduce the interference of the dryer air flow with other components in the printer.

A return path 72 is provided to receive a sheet from the media transport 42 after a substrate has been completely or partially printed and passed through the dryer 30. The sheet is moved by the rotation of rollers in a direction opposite to the direction of movement in the process direction past the printheads. At position 76 in the return path 72, the substrate can be turned over so it can merge into the job stream being carried by the media transport 42 and the opposite side of the media sheet can be printed. The controller 80 is configured to flip the sheet selectively. That is, the controller 80 can operate actuators to turn the sheet over so the reverse side of the sheet can be printed or it can operate actuators so the sheet is returned to the transport path without turning over the sheet so the printed side of the sheet can be printed again. Movement of pivoting member 88 provides access to the return path 72. Rotation of pivoting member 88 is controlled by controller 80 selectively operating an actuator 40 operatively connected to the pivoting member 88. When pivoting member 88 is rotated counterclockwise as shown in FIG. 1, a substrate from media transport 42 is diverted to the return path 72. Rotating the pivoting member 88 in the clockwise direction from the diverting position closes access to the return path 72 so substrates on the media transport move to the receptacle 56. Another pivoting member 86 is positioned between position 76 in the return path 72 and the media transport 42. When controller 80 operates an actuator to rotate pivoting member 86 in the counterclockwise direction, a substrate from the return path 72 merges into the job stream on media transport 42. Rotating the pivoting member 86 in the clockwise direction closes the return path access to the media transport 42.

The printer 10 is configured with two optical sensors 84. The optical sensor 84 that precedes the print zone in the process direction is used to generate image data of partially printed ink images returned to the media transport 42 for a second pass of the media sheet through the print zone for completion of the ink image. The optical sensor 84 that follows the print zone in the process direction is used to generate image data of completely printed and partially printed ink images that have passed through the dryer. The optical sensors 84 can be a digital camera, an array of LEDs and photodetectors, or other devices configured to generate image data of a passing surface.

As further shown in FIG. 1, the printed media sheets S not diverted to the return path 72 are carried by the media transport to the sheet receptacle 56 in which they are be collected. Before the printed sheets reach the receptacle 56, they pass by an optical sensor 84. The optical sensor 84 generates image data of the printed sheets. When this image data corresponds to a completely printed ink image, the data is analyzed by the controller 80 to evaluate image quality of the printed ink images. In one embodiment, the controller 80 evaluates image quality be being configured to detect streakiness in the printed images on the media sheets of a print job. Additionally, sheets that are printed with test pattern images are inserted at intervals during the print job. These test pattern images are analyzed by the controller 80 to determine which inkjets, if any, that were operated to eject ink into the test pattern did in fact do so, and if an inkjet did eject an ink drop whether the drop landed at its intended position with an appropriate mass. Any inkjet not ejecting an ink drop it was supposed to eject or ejecting a drop not having the right mass or landing at an errant position is called an inoperative inkjet in this document. The controller can store data identifying the inoperative inkjets in database 92 operatively connected to the controller. These sheets printed with the test patterns are sometimes called run-time missing inkjet (RTMJ) sheets and these sheets are discarded from the output of the print job. A user can operate the user interface 50 to obtain reports displayed on the interface that identify the number of inoperative inkjets and the printheads in which the inoperative inkjets are located. As already noted, the media transport also includes a return path that can turn a sheet over and return it to the media transport prior to the printhead modules so the opposite side of the sheet can be printed. When the sheet is turned over for return printing, the optical sensor 84 that precedes the print zone in the process direction is not operated. Instead, the optical sensor that precedes the print zone in the process direction is only operated when a media sheet on which an ink image has been partially printed is returned to the media transport 42 for completion of the ink image. This process is discussed more fully below with reference to FIG. 2. While FIG. 1 shows the printed sheets as being collected in the sheet receptacle, they can be directed to other processing stations (not shown) that perform tasks such as folding, collating, binding, and stapling of the media sheets.

Operation and control of the various subsystems, components and functions of the machine or printer 10 are performed with the aid of a controller or electronic subsystem (ESS) 80. The ESS or controller 80 is operatively connected to the components of the printhead modules 34A-34D (and thus the printheads), the actuators 40, and the dryer 30. The ESS or controller 80, for example, is a self-contained computer having a central processor unit (CPU) with electronic data storage, and a display or user interface (UI) 50. The ESS or controller 80, for example, includes a sensor input and control circuit as well as a pixel placement and control circuit. In addition, the CPU reads, captures, prepares, and manages the image content data flow between image input sources, such as a scanning system or an online or a work station connection (not shown), and the printhead modules 34A-34D. As such, the ESS or controller 80 is the main multi-tasking processor for operating and controlling all of the other machine subsystems and functions, including the printing process.

The controller 80 can be implemented with general or specialized programmable processors that execute programmed instructions. The instructions and data required to perform the programmed functions can be stored in memory associated with the processors or controllers. The processors, their memories, and interface circuitry configure the controllers to perform the operations described below. These components can be provided on a printed circuit card or provided as a circuit in an application specific integrated circuit (ASIC). Each of the circuits can be implemented with a separate processor or multiple circuits can be implemented on the same processor. Alternatively, the circuits can be implemented with discrete components or circuits provided in very large scale integrated (VLSI) circuits. Also, the circuits described herein can be implemented with a combination of processors, ASICs, discrete components, or VLSI circuits.

In operation, ink image content data for an ink image to be produced is sent to the controller 80 from either a scanning system or an online or work station connection. The ink image content data is processed to generate the inkjet ejector firing signals delivered to the printheads in the modules 34A-34D. Along with the ink image content data, the controller receives print job parameters that identify the media weight, media dimensions, print speed, media type, ink area coverage to be produced on each side of each sheet, location of the image to be produced on each side of each sheet, media color, media fiber orientation for fibrous media, print zone temperature and humidity, media moisture content, and media manufacturer. As used in this document, the term “print job parameters” means non-image content data for a print job and the term “ink image content data” means digital data that identifies a color and a volume of each ejected ink drop that forms pixels in an ink image to be printed on a media sheet.

Figure 2:
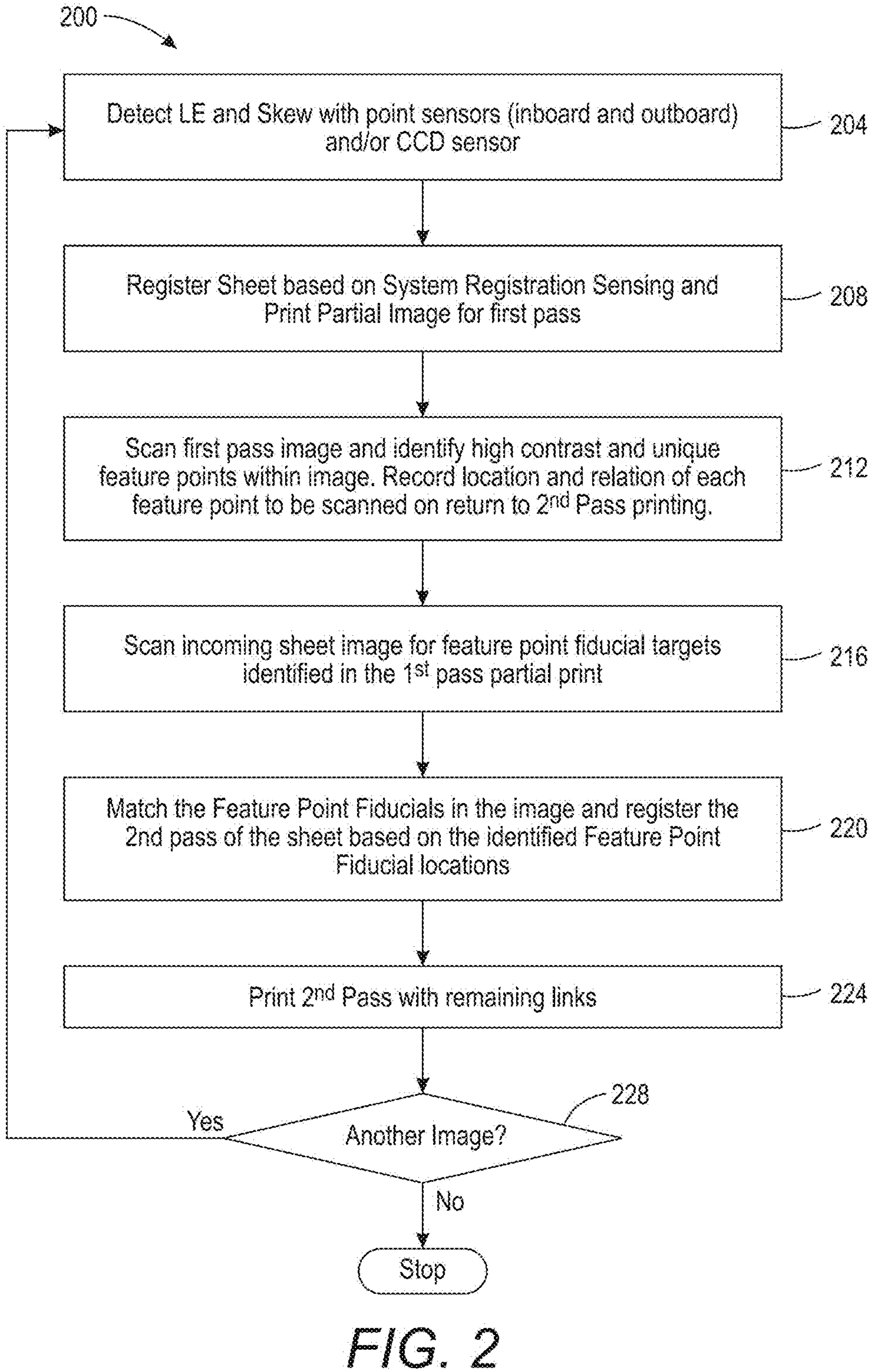
FIG. 2 is a flow diagram of a process for operating the printer of FIG. 1 to print ink images on the media sheets in stages that are separated by ink drying.

FIG. 2 depicts a flow diagram for a process 200 that passes media sheets through the print zone twice to print complete ink images on a single side of a media sheet. In the discussion below, a reference to the process 200 performing a function or action refers to the operation of a controller, such as controller 80, to execute stored program instructions to perform the function or action in association with other components in the printer. The process 200 is described as being performed with the printer 10 of FIG. 1 for illustrative purposes.

Figure 3A:
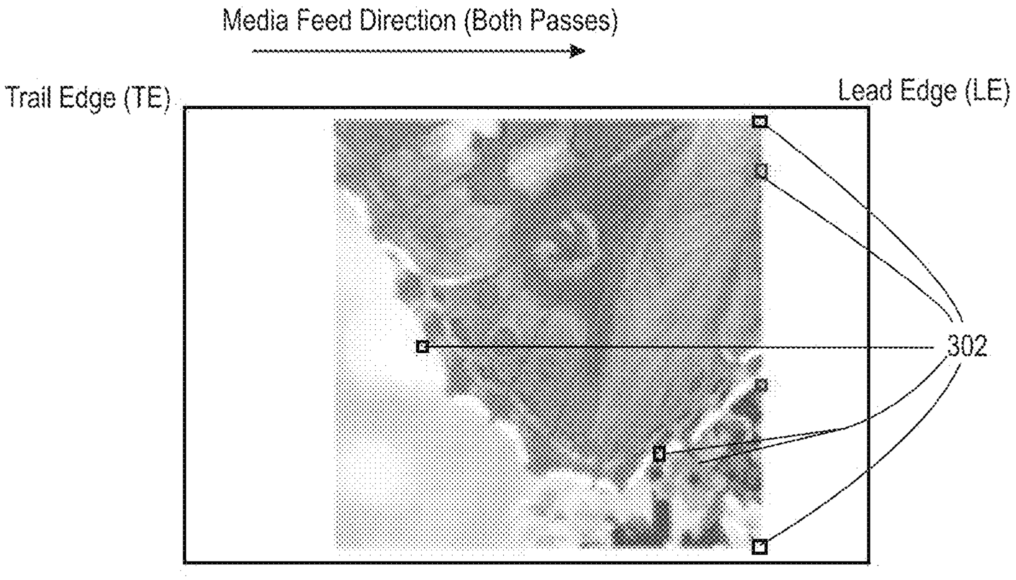
FIG. 3A is a partial printed image showing identified features useful for registration of the partial printed image prior to a second pass through the print zone.
Figure 3B:
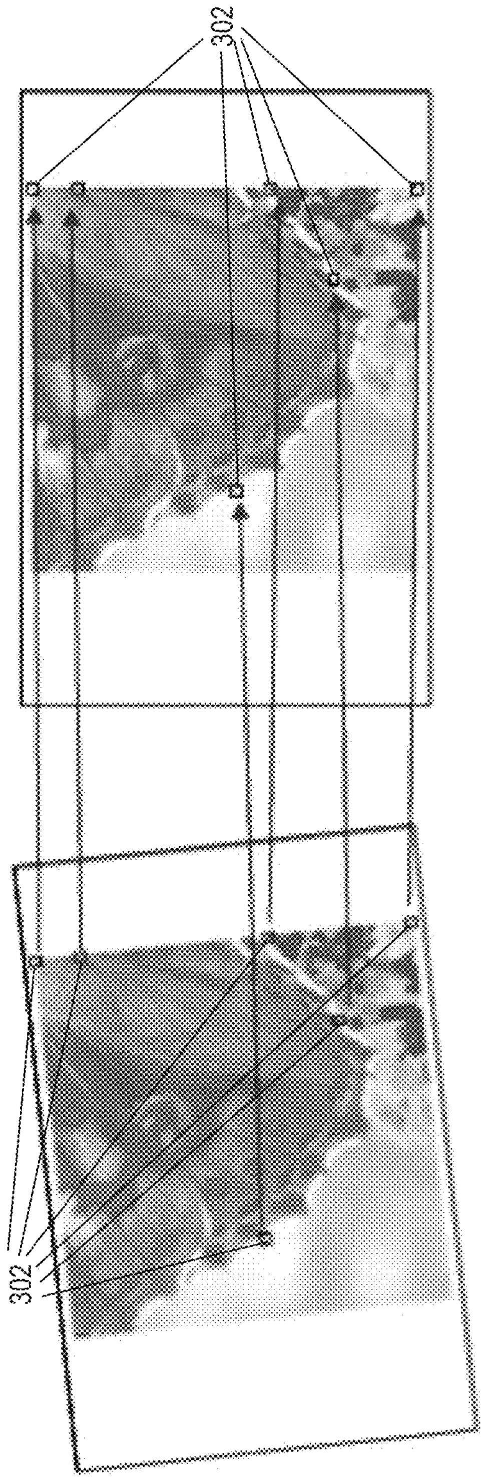
FIG. 3B shows the partial printed image of FIG. 3A skewed and the mapping of the identified features of FIG. 3A to the skewed partial printed image for registration of the remainder of the ink image to be printed on the skewed partial printed image during the second pass through the print zone.
Figure 4:
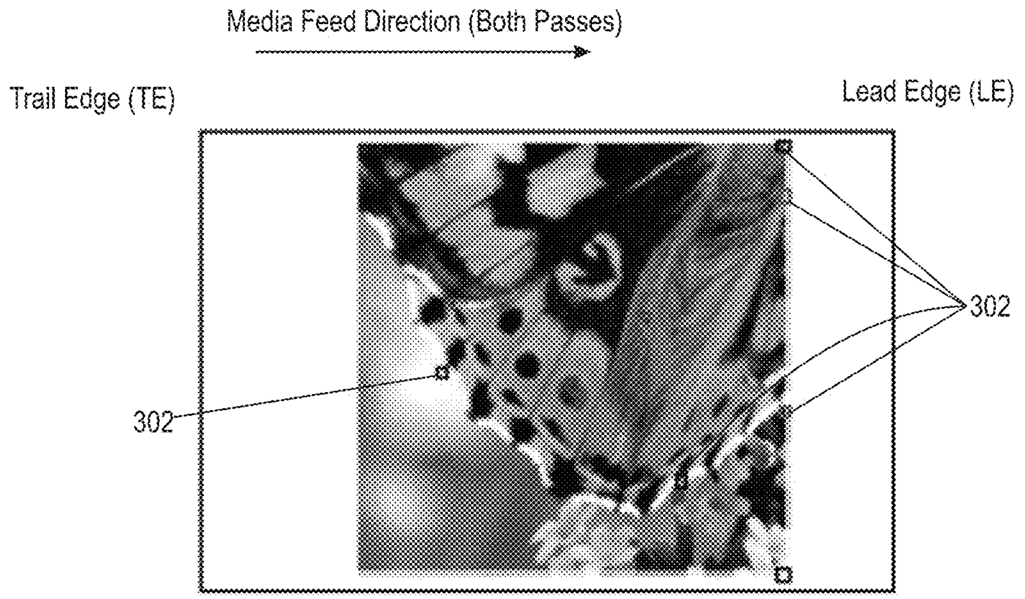
FIG. 4 is the composite image after passing through the print zone the second time.

Prior to process 200 operating the printer 10, the controller determines from the print job parameters require ink images to be printed in two or more passes. For example, some types of inks or media benefit from two pass printing. If a print job is to be printed using a multiple printing pass process, then process 200 begins by detecting the leading edge of a media sheet and its skew using known point sensors or charged coupled devices (block 204). The media sheet is then printed with one or more, but not all, of the color separations for the ink image (block 208). After the partially printed media sheet passes through the dryer, the optical sensor 84 following the print zone in the process direction generates image data of the partially printed sheet and image features are identified using known techniques (block 212). An example of a sheet printed with an ink image consisting of a yellow color separation and a magenta color separation only having identified image features 302 is shown in FIG. 3A. The partially printed sheet is then diverted to the return path 72 and returned to the media transport without inverting the sheet and the non-inverted sheet passes the optical sensor preceding the print zone in the process direction and image data of the partially printed image is generated and analyzed to detect the features previously identified (block 216). FIG. 3B shows the identified image features 302 in the image of FIG. 3A being mapped to the skewed image of FIG. 3B before the sheet passes through the print zone a second time. The differentials in the positions of the identified features in the two scanned images are used to register the remaining color separations of the ink image to the partially printed sheet as it passes through the print zone for the second time (block 220). The sheet is then printed with the remaining color separations (block 224). The resulting composite image that includes the cyan and black color separations is shown in FIG. 4. The sheet can then be imaged for image quality issues after it passes through the dryer or sent to the receptacle for later collection. The process determines if another two pass image is to be printed (block 228) and the process is repeated if there is another image. Otherwise, the process terminates. Thus, both optical sensors 84 are operated to perform multi-pass printing of color separations. The optical sensor 84 that follows the print zone in the process direction cannot be used alone for multi-pass printing since the transportation of the partially printed sheet through the return path and its merger onto the media transport 42 disturbs the orientation of the partially printed sheet sufficiently that registration of the remaining color separations to be printed with the partially printed color separations cannot be accurately obtained without the image data generated by the optical sensor 84 that precedes the print zone in the process direction.

Figure 5:
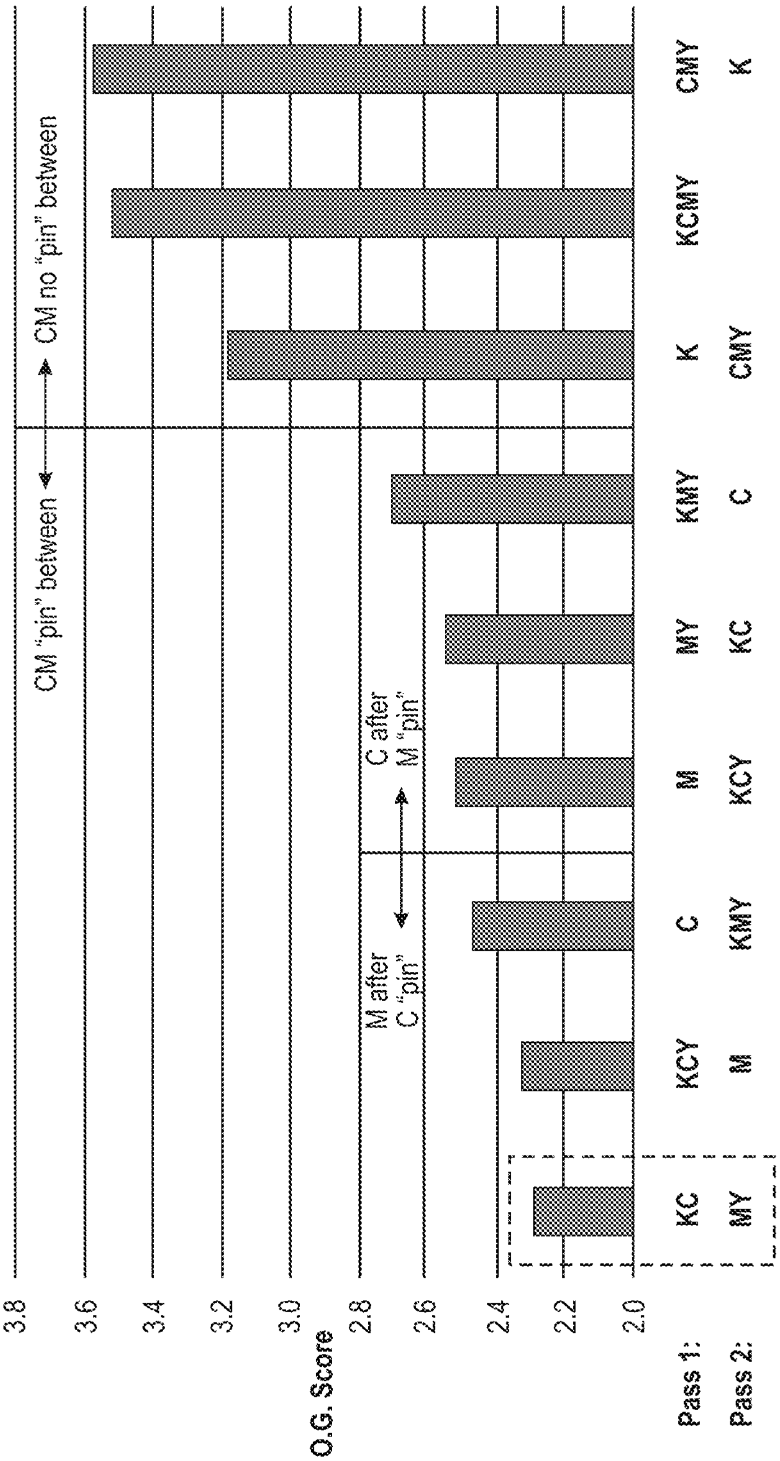
FIG. 5 is a graph showing the overlay graininess scores for different combinations of color separations printed in multi-pass and single pass printing operations.

FIG. 5 is a graph showing the overlay graininess scores for different combinations of color separations printed in multi-pass and single pass printing operations. The printer has printheads that eject cyan, magenta, yellow, and black inks onto coated media at a frequency of 80 Khz with ink drops having a volume of 3.2 pl. As used in this document, the term “pin” means to heat one or more printed inks to heat to dry the ink drops and fix their locations. As shown in the graph of FIG. 5, overlay graininess scores are lower when cyan ink printed during a first pass is pinned before magenta ink is printed on the sheet during a second pass. Also, overlay graininess scores are lower when black ink is printed during the first pass before the cyan ink is pinned. The three rightmost bars in the graph indicate that the overlay graininess scores are substantially higher when cyan and magenta are printed in the same pass or all of the color separations are printed in a single pass through the print zone. The best overlay graininess score occurs when black and cyan are printed during the first pass and magenta and yellow are printed in the second pass.

It will be appreciated that variants of the above-disclosed and other features, and functions, or alternatives thereof, may be desirably combined into many other different systems or applications. Various presently unforeseen or unanticipated alternatives, modifications, variations, or improvements therein may be subsequently made by those skilled in the art, which are also intended to be encompassed by the following claims.

What is claimed is:

1. An inkjet printer comprising:

at least one printhead;

a media transport for moving a media sheet through a print zone opposite the at least one printhead in a process direction;

a first optical sensor that precedes the print zone in the process direction;

a second optical sensor that follows the print zone in the process direction;

a dryer that follows the at least one printhead in the process direction and that precedes the second optical sensor in the process direction, the dryer being configured to expose the media sheet to heat;

a return path that returns the media sheet to the media transport at a position that precedes the first optical sensor; and a controller operatively connected to the at least one printhead, the media transport, the first optical sensor, the second optical sensor, and an actuator that diverts the media sheet onto the return path, the controller being configured to:

operate the at least one printhead to print less than all color separations for an ink image to be printed on a first side of the media sheet as the media sheet passes through the print zone a first time;

operate the second optical sensor to generate image data of the color separations printed on the media sheet after the media sheet has passed through the print zone the first time;

analyze the image data generated by the second optical sensor to identify image features in the color separations printed on the media sheet;

operate the actuator to divert the media sheet to the return path without inverting the media sheet to enable the first side of the media sheet to be printed a second time;

operate the first optical sensor to generate image data of the color separations printed on the first side of the media sheet before the media sheet passes through the print zone the second time;

analyze the image data generated by the first optical sensor to identify the image features in the color separations printed on the first side of the media sheet;

compare positions of the image features in the image data generated by the second optical sensor to positions of the image features in the image data generated by the first optical sensor to register ink image content data for color separations remaining to be printed with the color separations printed on the first side of the media sheet; and operate the at least one printhead to print at least one of the color separations remaining to be printed on the first side of the media sheet as the media sheet passes through the print zone the second time.

2. The inkjet printer of claim 1, the controller being further configured to:

operate the at least one printhead to print all of the color separations remaining to be printed on the first side of the media sheet as the media sheet passes through the print zone the second time.

3. The inkjet printer of claim 1, the controller being further configured to:

operate the at least one printhead to print at least a cyan color separation on the first side of the media sheet during the first time through the print zone and to print at least a magenta color separation on the first side of the media sheet during the second time the media sheet passes through the print zone.

4. The inkjet printer of claim 3, the controller being further configured to:

operate the at least one printhead to print a black color separation with the cyan color separation on the first side of the media sheet during the first time the media sheet passes through the print zone.

5. The inkjet printer of claim 4, the controller being further configured to:

operate the at least one printhead to print a yellow color separation with the cyan color separation and the black color separation on the first side of the media sheet during the first time that the media sheet passes through the print zone.

6. The inkjet printer of claim 4, the controller being further configured to:

operate the at least one printhead to print a yellow color separation with the magenta color separation on the first side of the media sheet during the second time that the media sheet passes through the print zone.

7. The inkjet printer of claim 3, the controller being further configured to:

operate the at least one printhead to print a black color separation with the magenta color separation and the yellow color separation on the first side of the media sheet during the second time the media sheet passes through the print zone.

8. The inkjet printer of claim 1, the controller being further configured to:

operate the at least one printhead to print at least a magenta color separation on the first side of the media sheet during the first time the media sheet passes through the print zone and to print at least a cyan color separation on the first side of the media sheet during the second time the media sheet passes through the print zone.

9. The inkjet printer of claim 8, the controller being further configured to:

operate the at least one printhead to print a black color separation with the cyan color separation on the first side of the media sheet during the second time the media sheet passes through the print zone.

10. The inkjet printer of claim 9, the controller being further configured to:

operate the at least one printhead to print a yellow color separation with the cyan color separation and the black color separation on the first side of the media sheet during the second time the media sheet passes through the print zone.

11. The inkjet printer of claim 8, the controller being further configured to:

operate the at least one printhead to print a yellow color separation with the magenta color separation on the first side of the media sheet during the first time the media sheet passes through the print zone.

12. The inkjet printer of claim 11, the controller being further configured to:

operate the at least one printhead to print a black color separation with the magenta color separation and the yellow color separation on the first side of the media sheet during the first time the media sheet passes through the print zone.

13. A method of operating an inkjet printer comprising:

operating at least one printhead in the inkjet printer to print on a first side of a media sheet less than all color separations for an ink image to be printed on the media sheet as the media sheet passes through a print zone opposite the at least one printhead a first time;

operating a first optical sensor to generate image data of the color separations printed on the first side of the media sheet after the media sheet has passed through the print zone the first time;

analyzing the image data generated by the first optical sensor to identify image features in the color separations printed on the first side of the media sheet;

diverting the media sheet to a return path that is configured to return the media sheet to a media transport at a position that precedes a second optical sensor without inverting the media sheet;

operating the second optical sensor to generate image data of the color separations printed on the first side of the media sheet before the media sheet passes through the print zone a second time;

analyzing the image data generated by the second optical sensor to identify the image features in the color separations printed on the first side of the media sheet;

comparing positions of the image features in the image data generated by the second optical sensor to positions of the image features in the image data generated by the first optical sensor to register ink image content data for color separations remaining to be printed with the color separations printed on the first side of the media sheet; and operating the at least one printhead to print at least one of the color separations remaining to be printed on the first side of the media sheet as the media sheet passes through the print zone the second time.

14. The method of claim 13 further comprising:

operating the at least one printhead to print all of the color separations remaining to be printed on the first side of the media sheet as the media sheet passes through the print zone the second time.

15. The method of claim 13 further comprising:

operating the at least one printhead to print at least a cyan color separation on the first side of the media sheet during the first time the media sheet passes through the print zone and to print at least a magenta color separation on the first side of the media sheet during the second time the media sheet passes through the print zone.

16. The method of claim 15 further comprising:

operating the at least one printhead to print a black color separation with the cyan color separation on the first side of the media sheet during the first time the media sheet passes through the print zone.

17. The method of claim 16 further comprising:

operating the at least one printhead to print a yellow color separation with the cyan color separation and the black color separation on the first side of the media sheet during the first time the media sheet passes through the print zone.

18. The method of claim 16 further comprising:

operating the at least one printhead to print a yellow color separation with the magenta color separation on the first side of the media sheet during the second time the media sheet passes through the print zone.

19. The method of claim 15 further comprising:

operating the at least one printhead to print a black color separation with the magenta color separation and the yellow color separation on the first side of the media sheet during the second time the media sheet passes through the print zone.

20. The method of claim 13 further comprising:

operating the at least one printhead to print at least a magenta color separation on the first side of the media sheet during the first time the media sheet passes through the print zone and to print at least a cyan color separation on the first side of the media sheet during the second time the media sheet passes through the print zone.

21. The method of claim 20 further comprising:

operating the at least one printhead to print a black color separation with the cyan color separation on the first side of the media sheet during the second time the media sheet passes through the print zone.

22. The method of claim 21 further comprising:

operating the at least one printhead to print a yellow color separation with the cyan color separation and the black color separation on the first side of the media sheet during the second time the media sheet passes through the print zone.

23. The method of claim 20 further comprising:

operating the at least one printhead to print a yellow color separation with the magenta color separation on the first side of the media sheet during the first time the media sheet passes through the print zone.

24. The method of claim 23 further comprising:

operating the at least one printhead to print a black color separation with the magenta color separation and the yellow color separation on the first side of the media sheet during the first time the media sheet passes through the print zone.

* * * * *